(12) United States Patent
Wang et al.

(10) Patent No.: US 11,190,231 B1
(45) Date of Patent: Nov. 30, 2021

(54) MULTIPLEXING OF RESOURCE BLOCKS WITHIN A COMMUNICATIONS NETWORK FOR DYNAMIC SERVICE PROVISIONING

(71) Applicant: Fujitsu Limited, Kawasaki (JP)

(72) Inventors: Nannan Wang, Allen, TX (US); Xi Wang, Murphy, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/939,794

(22) Filed: Jul. 27, 2020

(51) Int. Cl.
*H04W 72/02* (2009.01)
*H04B 1/66* (2006.01)
*H04W 72/12* (2009.01)
*H04W 72/08* (2009.01)

(52) U.S. Cl.
CPC ............ *H04B 1/662* (2013.01); *H04W 72/02* (2013.01); *H04W 72/08* (2013.01); *H04W 72/121* (2013.01); *H04W 72/1263* (2013.01)

(58) Field of Classification Search
None
See application file for complete search history.

(56) References Cited

U.S. PATENT DOCUMENTS

| | | | |
|---|---|---|---|
| 2018/0279291 A1* | 9/2018 | Tiirola | H04B 1/713 |
| 2019/0208534 A1* | 7/2019 | Chen | H04L 27/2607 |
| 2021/0045146 A1* | 2/2021 | Beale | H04L 5/0037 |
| 2021/0092671 A1* | 3/2021 | Manolakos | H04L 5/0048 |
| 2021/0250927 A1* | 8/2021 | Liu | H04W 72/087 |
| 2021/0281375 A1* | 9/2021 | Wang | H04L 5/0044 |

OTHER PUBLICATIONS

Pihkola, et al., "Evaluating the Energy Consumption of Mobile Data Transfer From Technology Development to Consumer Behaviour and Life Cycle Thinking," *Sustainability*, vol. 10, No. 7, pp. 2494-2510, Oct. 2018.

Alsenwi, et al., "eMBB-URLLC Resource Slicing: A Risk-Sensitive Approach," *IEEE Communications Letters*, vol. 23, No. 4, pp. 740-743, Feb. 2019.

Bairagi, et al., "Coexistence Mechanism between eMBB and uRLLC in 5G Wireless Networks," *IEEE Transactions on Communications*, arXiv:2003.04551 [cs.NI], Mar. 2020.

* cited by examiner

*Primary Examiner* — Kodzovi Acolatse
(74) *Attorney, Agent, or Firm* — Baker Botts L.L.P.

(57) ABSTRACT

Systems and methods for transmitting, within a time slot, i) first eMBB resource blocks to a first UE and ii) second eMBB resource blocks to a second UE; during transmission of the first and the second eMBB resource blocks to the first and the second UE, respectively, at a first scheduled check point: identifying i) first URLLC resource blocks to be transmitted to a third UE and ii) second URLLC resource blocks to be transmitted to a fourth UE; identifying i) a first transmission deadline for transmitting the first URLLC resource blocks to the third UE and ii) a second transmission deadline for transmitting the second URLLC resource blocks to the fourth UE; generating a transmission queue for the first URLLC resource blocks and the second URLLC resource blocks; and selecting, based on the transmission queue, the second URLLC resource blocks for transmission to the fourth UE.

16 Claims, 10 Drawing Sheets

MULTIPLEXING OF RESOURCE BLOCKS WITHIN A COMMUNICATIONS NETWORK FOR DYNAMIC SERVICE PROVISIONING

BACKGROUND

Field of the Disclosure

The present disclosure relates generally to multiplexing within a communications network for dynamic service provisioning.

Description of the Related Art

In cellular radio systems, wireless terminals communicate via a radio access network (RAN), with one or more core networks. The wireless terminals can be mobile stations or other types of user equipment, such as portable, pocket, hand-held, computer-included, or car-mounted mobile devices which communicate voice and/or data with the radio access network, e.g., mobile telephones and laptops with wireless capability.

The International Telecommunication Union Radiocommunication (ITU-R) of the International Telecommunication Union (ITU) has outlined standards for fifth generation technology (5G) for cellular networks. The ITU-R outlines three key use cases for 5G including enhanced mobile broadband (eMBB), ultra reliable low latency communication (URLLC), and massive machine type communications (mMTC). For example, eMBB can be employed with XR traffic (AR, VR, MR)—the entertainment system in XR devices requires high bandwidth communications. mMTC can be employed for smart cities—street lighting control and traffic light management requires massive reliable network connectivity. URLLC can be employed with connected cars—remote cruising assist and intelligent driving requires ultra low latency; and industry automation—robotic motion control and video-driven machine-human interaction.

SUMMARY

Innovative aspects of the subject matter described in this specification may be embodied in methods for multiplexing with a communications network that include the actions of transmitting, within a time slot, i) first enhanced mobile broadband (eMBB) resource blocks to a first user equipment (UE) and ii) second eMBB resource blocks to a second UE, the time slot including scheduled checkpoints; during transmission of the first and the second eMBB resource blocks to the first and the second UE, respectively, at a first scheduled check point of the schedule checkpoints of the time slot: identifying i) first ultra reliable low latency communication (URLLC) resource blocks to be transmitted to a third UE and ii) second URLLC resource blocks to be transmitted to a fourth UE; identifying i) a first transmission deadline for transmitting the first URLLC resource blocks to the third UE and ii) a second transmission deadline for transmitting the second URLLC resource blocks to the fourth UE, wherein the second transmission deadline is prior to the first transmission deadline; generating a transmission queue for the first URLLC resource blocks and the second URLLC resource blocks, wherein an order of the transmission queue is based on the first transmission deadline of the first URLLC resource blocks and the second transmission deadline of the second URLLC resource blocks; selecting, based on the transmission queue, the second URLLC resource blocks for transmission to the fourth UE, including: identifying a time window within the time slot for transmitting the second URLLC resource blocks to the fourth UE, the time window defined between the first scheduled check point and a second scheduled check point after the first scheduled check point; identifying the first eMBB resource blocks for interruption based on a throughput of each the first eMBB resource blocks and the second eMBB resource blocks to the first UE and the second UE, respectively; transmitting an interrupt transmission signal to the first UE indicating the transmission of the first eMBB resource blocks is interrupted; transmitting a grant transmission signal to the fourth UE indicating transmission of the second URLLC resource blocks; and transmitting the second URLLC resource blocks to the fourth UE within the time window.

Other embodiments of these aspects include corresponding systems, apparatus, and computer programs, configured to perform the actions of the methods, encoded on computer storage devices.

These and other embodiments may each optionally include one or more of the following features. For instance, after transmitting the second URLLC resource blocks to the fourth UE within the time window, resuming transmission of the first eMBB resource blocks to the first UE. The second transmission deadline is before the second scheduled check point. After transmitting the second URLLC resource blocks to the fourth UE, selecting the first URLLC resource blocks for transmission to the third UE, including: identifying the second eMBB resource blocks for interruption based on the throughput of each the first eMBB resource blocks and the second eMBB resource blocks to the first UE and the second UE, respectively; transmitting an additional interrupt transmission signal to the second UE indicating the transmission of the second eMBB resource blocks is interrupted; transmitting an additional grant transmission signal to the third UE indicating transmission of the first URLLC resource blocks; and transmitting the first URLLC resource blocks to the third UE within the time window. After transmitting the second URLLC resource blocks to the fourth UE, selecting the first URLLC resource blocks for transmission to the third UE, including: determining that the time window is insufficient for transmitting the first URLLC resource blocks to the third UE; in response to determining that the time window is insufficient for transmitting the first URLLC resource blocks to the third UE, enlarging the time window, the enlarged time window defined between the first scheduled check point and the first transmission deadline; identifying the second eMBB resource blocks for interruption based on the throughput of each the first eMBB resource blocks and the second eMBB resource blocks to the first UE and the second UE, respectively; transmitting an additional interrupt transmission signal to the second UE indicating the transmission of the second eMBB resource blocks is interrupted; transmitting an additional grant transmission signal to the third UE indicating transmission of the first URLLC resource blocks; and transmitting the first URLLC resource blocks to the third UE within the enlarged time window.

The first transmission deadline is after the second scheduled check point. After transmitting the second URLLC resource blocks to the fourth UE, selecting the first URLLC resource blocks for transmission to the third UE, including: determining that the time window is insufficient for transmitting the first URLLC resource blocks to the third UE; in response to determining that the time window is insufficient for transmitting the first URLLC resource blocks to the third UE, enlarging the time window; determining that an end point of the enlarged time window is past the time slot; and in response to determining that the end point of the enlarged time window is past the time slot, blocking transmission of the first URLLC resource blocks within the time slot. Identifying the first eMBB resource blocks for interruption based on the throughput of each the first eMBB resource blocks and the second eMBB resource blocks to the first UE and the second UE, respectively, comprises: identifying a first throughput of the first eMBB resource blocks based on a difference of a maximal data size of the second URLLC resource blocks and a maximal data size of the first eMBB resource blocks; identifying a second throughput of the second eMBB resource blocks based on a difference of a maximal data size of the second URLLC resource blocks and a maximal data size of the second eMBB resource blocks; and determining that the first throughput is greater than the second throughput, and in response, selecting the first eMBB resource blocks for interruption.

Particular implementations of the subject matter described in this specification can be implemented so as to realize one or more of the following advantages. For example, the system and the method can satisfy the demands of transmitting the URLLC resource blocks, while concurrently maximizing network traffic throughput and decreasing the power consumption of user equipment.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF the EMBODIMENT(S)

Figure 1:
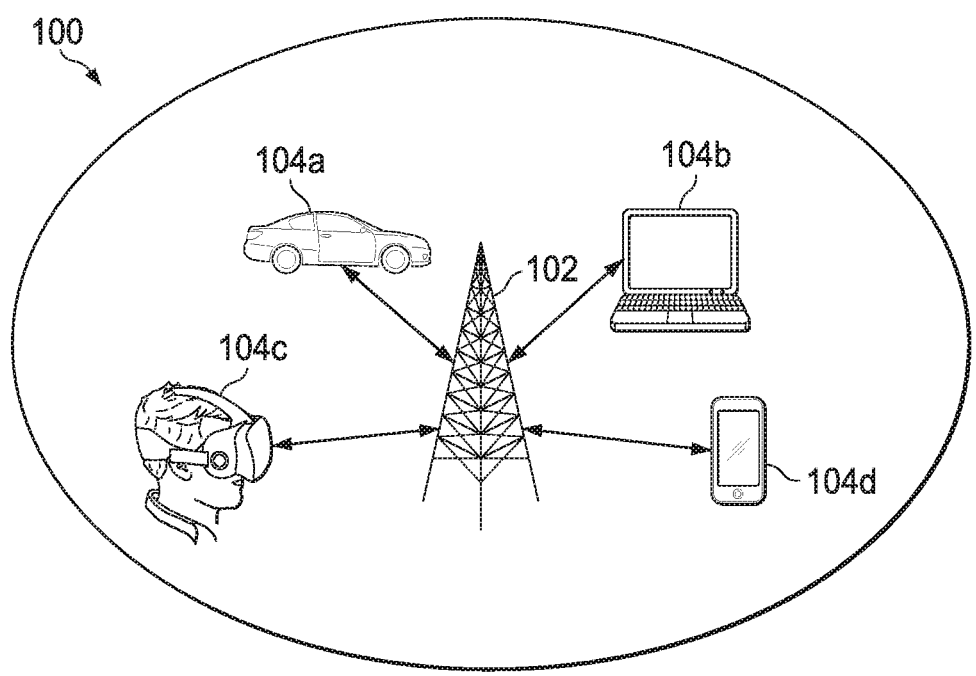
FIG. 1 is a block diagram of selected elements of an embodiment of a network environment.

This document describes a scheduling system and method of telecommunications networks (e.g., fifth generation new radio) for multiplexing enhanced mobile broadband (eMBB) resource blocks and ultra reliable low latency communication (URLLC) resource blocks. Specifically, this document describes the insertion (or "puncturing") of URLLC resource blocks within eMBB resource blocks transmission when there are no available bandwidth for the transmission of the URLLC resource blocks between a base station and user equipment of the telecommunications network. The scheduling system can include URLLC check points within a time slot used for transmitting eMBB resource blocks that are used to "check" for possible points for the transmission of the URLLC resource blocks. When the check points are encountered, the URLLC resource blocks can be inserted into the eMBB resource blocks by "puncturing," as described further herein.

Specifically, this document describes a system and a method for multiplexing within a communications network, including transmitting, within a time slot, i) first enhanced mobile broadband (eMBB) resource blocks to a first user equipment (UE) and ii) second eMBB resource blocks to a second UE, the time slot including scheduled checkpoints; during transmission of the first and the second eMBB resource blocks to the first and the second UE, respectively, at a first scheduled check point of the schedule checkpoints of the time slot: identifying i) first ultra reliable low latency communication (URLLC) resource blocks to be transmitted to a third UE and ii) second URLLC resource blocks to be transmitted to a fourth UE; identifying i) a first transmission deadline for transmitting the first URLLC resource blocks to the third UE and ii) a second transmission deadline for transmitting the second URLLC resource blocks to the fourth UE, wherein the second transmission deadline is prior to the first transmission deadline; generating a transmission queue for the first URLLC resource blocks and the second URLLC resource blocks, wherein an order of the transmission queue is based on the first transmission deadline of the first URLLC resource blocks and the second transmission deadline of the second URLLC resource blocks; selecting, based on the transmission queue, the second URLLC resource blocks for transmission to the fourth UE, including: identifying a time window within the time slot for transmitting the second URLLC resource blocks to the fourth UE, the time window defined between the first scheduled check point and a second scheduled check point after the first scheduled check point; identifying the first eMBB resource blocks for interruption based on a throughput of each the first eMBB resource blocks and the second eMBB resource blocks to the first UE and the second UE, respectively; transmitting an interrupt transmission signal to the first UE indicating the transmission of the first eMBB resource blocks is interrupted; transmitting a grant transmission signal to the fourth UE indicating transmission of the second URLLC resource blocks; and transmitting the second URLLC resource blocks to the fourth UE within the time window.

In the following description, details are set forth by way of example to facilitate discussion of the disclosed subject matter. It should be apparent to a person of ordinary skill in the field, however, that the disclosed embodiments are exemplary and not exhaustive of all possible embodiments.

FIG. 1 illustrates a network environment 100 for multiplexing of resource blocks with a communications network for dynamic service provisioning. The environment 100 includes a base station 102 (e.g., a next generation NodeB, also referred to as a gNodeB, or a gNB) and user equipment (UE) 104a, 104b, 104c, 140d (collectively referred to as UE 104). The environment 100 can include any number of UEs 104 depending on the application desired. In some examples, the UE 104a includes an autonomous vehicle (AV); the UE 104b includes a laptop computing device; the UE 104c includes a wearable computing device (such as AR/VR/MR wearable computing devices); and the UE 104d can include a mobile computing device (such as a smart phone or a tablet).

The base station 102 can be in communication with each of the UEs 104. That is, the base station 102 can transmit resource blocks that are received by the UEs 104; and the UEs 104 can transmit resource blocks that are received by the base station 102. The base station 102 and UEs 104 can schedule time slots for the transfer of resource blocks therebetween (i.e., transmission periodicity).

In some examples, the network environment 100 is a 5G (fifth generation) new radio (NR) radio access technology (RAT). The network environment 100 can employ two frequency ranges for communication of the resource blocks—i) sub-6 GHz frequency bands, and ii) millimeter wave range (24 GHz-100 GHz).

Figure 2:
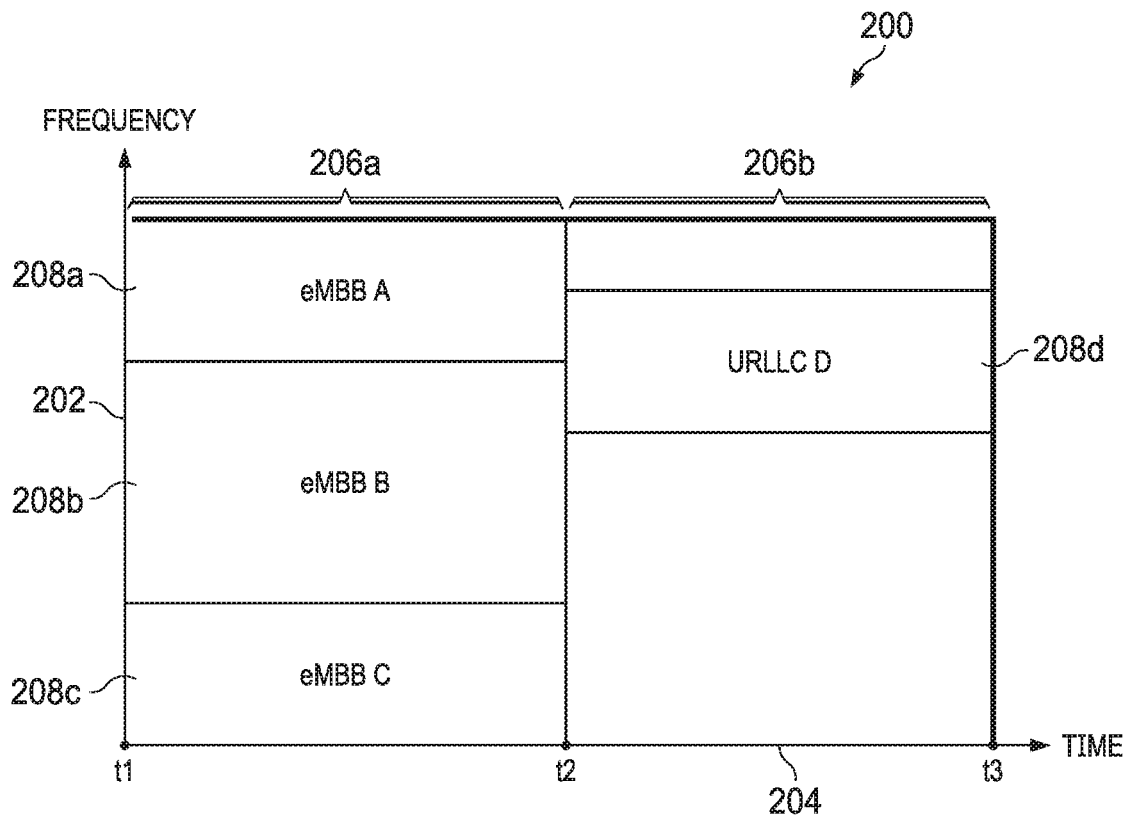
FIG. 2 illustrates an example timing diagram of communication of resource blocks between a base station and user equipment of the network environment.

FIG. 2 illustrates an example timing diagram 200 of communication of resource blocks between the base station 102 and the UE 104. Specifically, the timing diagram 200 illustrates the transmission of resource blocks over time, where a frequency of such transmission is indicated by the y-axis 202 and the time is indicated by the x-axis 204. A first time slot 206a is defined between times t1 and t2; and a second time slot 206b is defined between times t2 and t3. The base station 102 can transmit resource blocks 208a, 208b, 208c to UEs 104a, 104b, 104c, respectively, within the time slot 206a. The base station 102 can transmit resource block 208d to the UE 104d within the time slot 206b.

In some examples, the resource blocks 208 can include enhanced mobile broadband (eMBB) resource blocks, ultra reliable low latency communication (URLLC) resource blocks, and/or massive machine type communications (mMTC) resource blocks. For example, the resource blocks 208a, 208b, 208c can include eMBB resource blocks and the resource block 208d can include URLLC resource blocks.

To that end, to facilitate transmission of URLLC resource blocks between the base station 102 and the UEs 104, the network traffic therebetween can be multiplexed. Specifically, eMBB resource blocks transmitted between the base station 102 and the UEs 104 can be "punctured" for multiplexing URLLC resource blocks and eMBB resource blocks in the network environment 100. In other words, a transmission of the URLLC resource blocks between the base station 102 and the UEs 104 can preempt an ongoing transmission of eMBB resource blocks between the base station 102 and UEs 104.

Figure 3A:
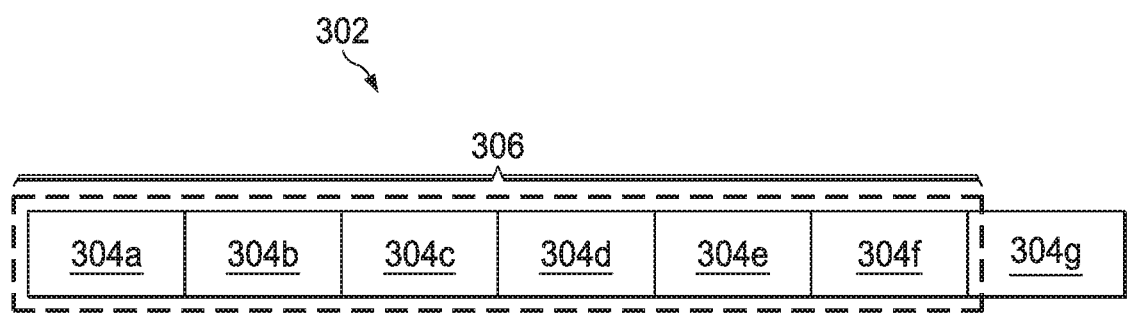
FIGS. 3A, 3B illustrates example enhanced mobile broadband (eMBB) resource blocks that are punctured by ultra reliable low latency communication (URLLC) resource blocks.
Figure 3B:
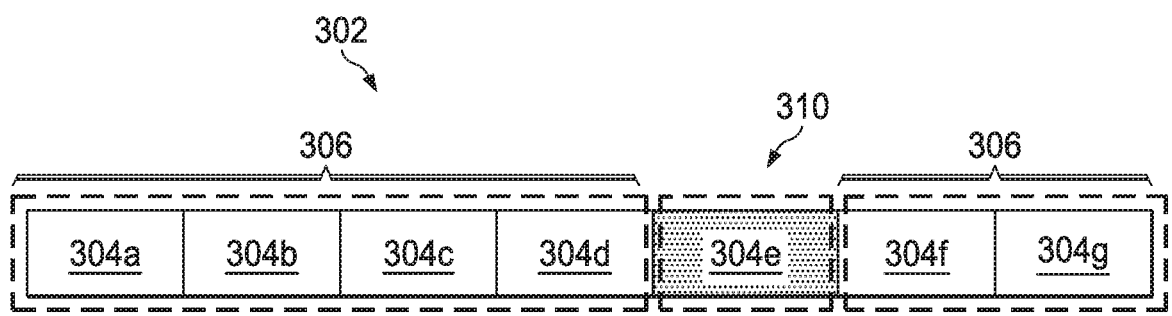

FIGS. 3A, 3B illustrates example eMBB resource blocks that are punctured by a URLLC resource block. Specifically, as shown in FIG. 3A, transmission resource blocks 302 that are transmitted between the base station 102 and a particular UE 104 can include multiple two-symbol-length slots 304a, 304b, 304c, 304d, 304e, 304f, 304g (collectively referred to as slots 304). Initially, slots 304a, 304b, 304c, 304d, 304e, 304f are scheduled for transmission of eMBB resource blocks 306 between the base station 102 and the particular UE 104.

As shown in FIG. 3B, the eMBB resource blocks 306 can be punctured by a URLLC resource block. Specifically, transmission of the eMBB resource blocks 306 at slot 304e is paused, and the URLLC resource block 310 is punctured (or inserted) at slot 304e. That is, the transmission of the eMBB resource blocks 306 from the base station 102 to the particular UE 104 can be halted at the slot 304e such that the URLLC resource block 310 can be inserted into the transmission between the base station 102 and the particular UE 104 at slot 304e. At slot 304f, transmission of the eMBB resource block 306 can continue at slots 304f, 304g.

Figure 4:
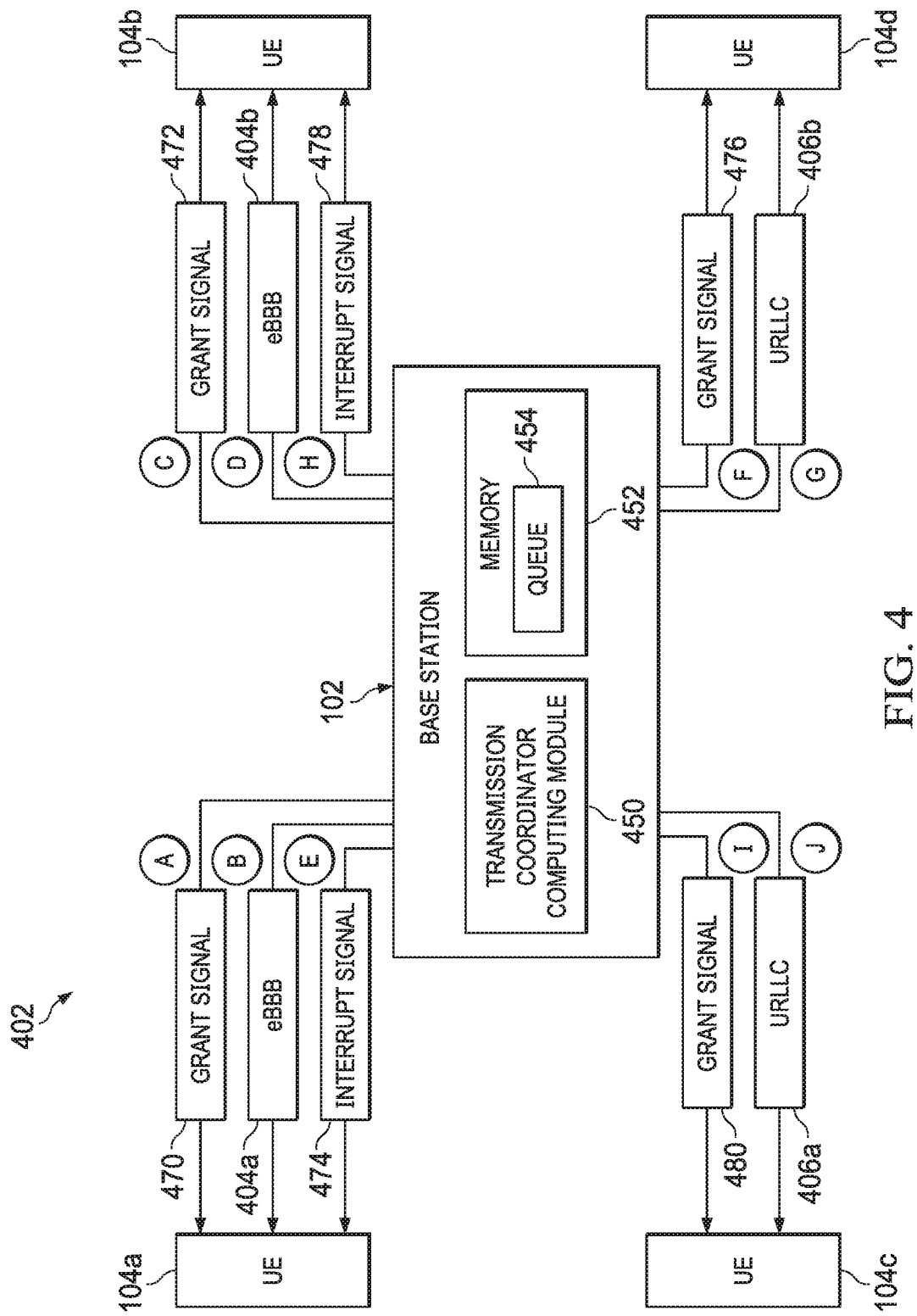
FIG. 4 is a block diagram of the network environment illustrating a downlink transmission between the base station and the user equipment.
Figure 5:
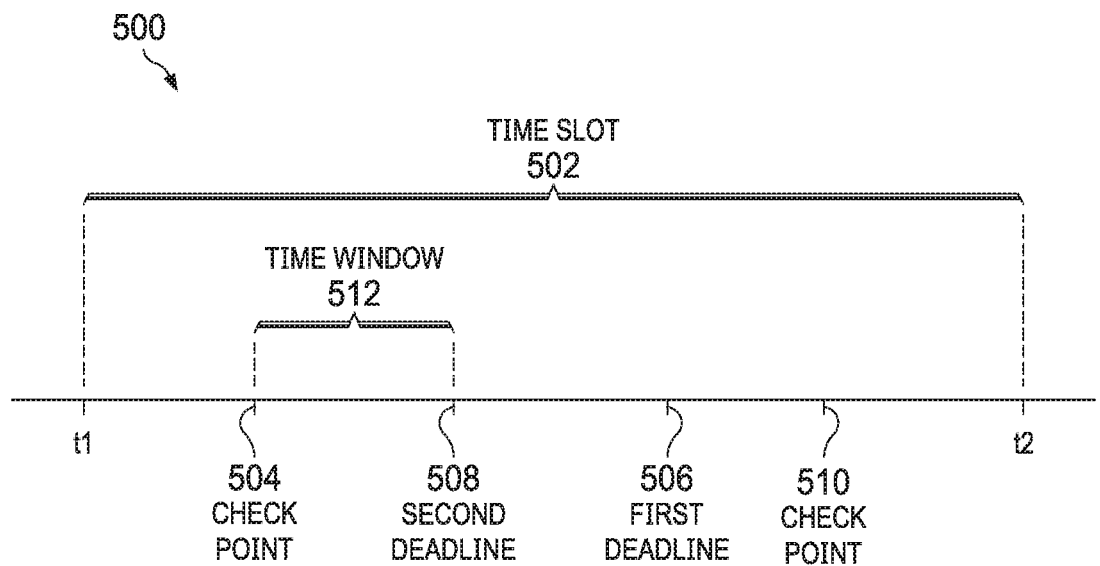
FIG. 5-7 illustrate respective timing diagrams for the downlink transmission of resource blocks between the base station and the user equipment.

FIG. 4 illustrates a network environment 402 illustrating a downlink transmission between the base station 102 and the UEs 104. The network environment 402 can be similar to the network environment 100 of FIG. 1. FIG. 5 illustrates a timing diagram 500 for the downlink transmission illustrated in FIG. 4 between the base station 102 and the UEs 104.

The base station 102 can include a transmission coordinator computing module 450 and a memory 452.

The base station 102, and in particular, the transmission coordinator computing module 450, transmits a scheduling grant signal 470 to the UE 104a for transmission of first eMBB resource blocks 404a to the UE 104a, at step A. For example, the scheduling grant signal 470 is carried by downlink control information (DCI) scrambled with a configured scheduled-radio network temporary identifier (CS-RNTI) on a physical download control channel (PDCCH) between the base station 102 and the UE 104a. The base station 102 begins transmitting the first eMBB resource blocks 404a to the first UE 104a, at step B.

The base station 102, and in particular, the transmission coordinator computing module 450, transmits a scheduling grant signal 472 to the UE 104b for transmission of second eMBB resource blocks 404b to the UE 104b, at step C. For example, the scheduling grant signal is carried by DCI scrambled with CS-RNTI on PDCCH between the base station 102 and the UE 104b. The base station 102 begins transmitting the second eMBB resource blocks 404b to the second UE 104b, at step D.

Referring to FIG. 5, the base station 102 can transmit the eMBB resource blocks 404a, 404b (collectively referred to as eMBB resource blocks 404) within a time slot 502. The time slot 502 can be defined between a first time t1 and a second time t2.

Referring to both FIGS. 4 and 5, during transmission of the eMBB resource blocks 404a, 404b to the UEs 104a, 140b, respectively, URLLC resource blocks can be inserted into the eMBB resource blocks 404 ("punctured"). Specifically, at a first scheduled check point 504 of the time slot 502, URLLC resource blocks can be inserted into the eMBB resource blocks 404. The base station 102, and in particular, the transmission coordinator computing module 450, can identify first URLLC resource blocks 406a to be transmitted to the UE 104c, and second URLLC resource blocks 406b to be transmitted to the UE 104d. The URLLC resource blocks 406a, 406b (collectively referred to as URLLC resource blocks 406) can be inserted into the eMBB resource blocks 404, described further herein.

The base station 102, and in particular, the transmission coordinator computing module 450, identifies a first transmission deadline 506 for transmitting the first URLLC resource blocks 406a to the UE 104c; and identifies a second transmission deadline 508 for transmitting the second URLLC resource blocks 406b to the UE 104d. As illustrated, the second transmission deadline 508 is prior to the first transmission deadline 506.

The base station 102, and in particular, the transmission coordinator computing module 450, generates a transmission queue 454 that is stored by the memory 452. The transmission queue 454 includes a listing of the first URLLC resource blocks 406a and the second URLLC resource blocks 406b. The order of the listing of the URLLC resource blocks 406 within the transmission queue 454 is based on the first transmission deadline 506 and the second transmission deadline 508. Specifically, the order of the listing of the URLLC resource blocks 406 is based on an ascending order of the deadlines 506, 508. In other words, the order of the listing of the URLLC resource blocks 406 indicates a transmission sequence for the URLLC resource blocks 406. To that end, as the second transmission deadline 508 is prior to the first transmission deadline 506, the second URLLC resource blocks 406b are slotted first for transmission at the transmission queue 454, and the first URLLC resource blocks 406a are slotted second for transmission at the transmission queue 454.

The transmission coordinator computing module 450 can select, based on the transmission queue 454, the second URLLC resource blocks 406b for transmission to the UE 104d. That is, as the transmission queue 454 indicates the second URLLC resource block 406b slotted first, the transmission coordinator computing module 450 can select the second URLLC resource blocks 406b for transmission to the UE 104d first (e.g., prior to selecting the first URLLC resource blocks 406a for transmission to the UE 104c).

Specifically, the transmission coordinator computing module 450 can identify a time window within the time slot 502 for transmitting the second URLLC resource blocks 406b to the UE 104d. The second URLLC resource blocks 406 are permitted to be scheduled for "puncturing" of an eMBB resource block 404 within the time window. The transmission coordinator computing module 450 can identify the beginning of the time window at the nearest check point and the end of the time window as the minimum of the next check point and the second transmission deadline 508 for the second URLLC resource blocks 406b. In other words, the time window is defined between [Tc, Min(Tn, d)], where Tc is the first check point 504, Tn is a second check point 510, and d is the second transmission deadline 508. In the current example, the transmission coordinator computing module 450 identifies a time window 512 between the first check point 504 and the second check point 510. The second transmission deadline 508 is prior to the second check point 510.

Additionally, the transmission coordinator computing module 450 can identify one of the eMBB resource blocks 404 for interruption and "puncturing" by the second URLLC resource blocks 406b. The transmission coordinator computing module 450 can identify one of the eMBB resource blocks 404 based on a throughput of each of the eMBB resource blocks 404 to the respective UE 104. Specifically, the transmission coordinator computing module 450 can identify a first throughput of the first eMBB resource blocks 404a based on a maximal data size of the second URLLC resource blocks 406b and a maximal data size of the first eMBB resource blocks 404a. In some examples, the transmission coordinator computing module 450 can identify the first throughput of the first eMBB resource blocks 404a based on a difference between the maximal data size of the second URLLC resource blocks 406b and the maximal data size of the first eMBB resource blocks 404a. For example, the base station 102 can transmit the first eMBB resource blocks 404a to the UE 104a utilizing a 16 QAM modulation format with a coding rate of 30 Mb (maximal data size of the first eMBB resource blocks 404a). Additionally, the maximal data size of the second URLLC resource blocks 406b can be 100 Mb. Thus, the first throughput of the first eMBB resource blocks 404a can be 70 Mb.

Similarly, the transmission coordinator computing module 450 can identify a second throughput of the second eMBB resource blocks 404b based on a maximal data size of the second URLLC resource blocks 406b and a maximal data size of the second eMBB resource blocks 404b. In some examples, the transmission coordinator computing module 450 can identify the second throughput of the second eMBB resource blocks 404b based on the difference between the maximal data size of the second URLLC resource blocks 406b and the maximal data size of the second eMBB resource blocks 404b. For example, the base station 102 can transmit the second eMBB resource blocks 404a to the UE 104b utilizing a QPSK modulation format with a coding rate of 80 Mb (maximal data size of the second eMBB resource blocks 404b). Additionally, the maximal data size of the second URLLC resource blocks 406b can be 100 Mb. Thus, the second throughput of the second eMBB resource blocks 404b can be 20 Mb.

The transmission coordinator computing module 450 can determine that the first throughput of the first eMBB resource blocks 404a is greater than the second throughput of the second eMBB resource blocks 404b. In response to determining that the first throughput of the first eMBB resource blocks 404a is greater than the second throughput of the second eMBB resource blocks 404b, the transmission coordinator computing module 450 can select the first eMBB resource blocks 404a for interrupting ("puncturing"). For example, as the second throughput of the second eMBB resource blocks 404b (70 Mb) is greater than the first throughput of the first eMBB resource blocks 404a (20 Mb), the transmission coordinator computing module 450 can select the first eMBB resource blocks 404a for interrupting ("puncturing").

The base station 102, and in particular, the transmission coordinator computing module 450, transmits an interrupt transmission signal 474 to the UE 104a to indicate transmission of the first eMBB resource blocks 404a is interrupted, at step E. For example, the interrupt transmission signal is carried by DCI scrambled with an interruption-radio network temporary identifier (INT-RNTI) on a PDCCH between the base station 102 and the UE 104a. The interrupt transmission signal 474 can indicate the resource (first eMBB resource blocks 404a) in time and frequency domain. In some examples, the UE 104a, upon reception of the interrupt transmission signal 474, pauses transmission of the first eMBB resource blocks 404a to reduce power consumption at the UE 104a.

The base station 102, and in particular, the transmission coordinator computing module 450, transmits a scheduling grant signal 476 to the UE 104d for transmission of the second URLLC resource blocks 406b to the UE 104d, at step F. For example, the scheduling grant signal 476 is carried by DCI with CS-RNTI on PDCCH between the base station 102 and the UE 104d. The base station 102 begins transmitting the second URLLC resource blocks 406b to the UE 104d within the time window 512, at step G.

The base station 102 can complete transmission of the second URLLC resource blocks 406b to the UE 104d within the time window 512. In some examples, after completion of the transmission of the second URLLC resource blocks 406b to the UE 104d, the base station 102 resumes transmission of the first eMBB resource blocks 404a to the UE 104a.

In some examples, after completion of the transmission of the second URLLC resource blocks 406b to the UE 104d, the transmission coordinator computing module 450 can select, based on the transmission queue 454, the first URLLC resource blocks 406a for transmission to the UE 104c. That is, as the transmission queue 454 indicates the first URLLC resource block 406a slotted second, the transmission coordinator computing module 450 can select the first URLLC resource blocks 406a for transmission to the UE 104c second (e.g., after selecting the second URLLC resource blocks 406b for transmission to the UE 104d).

The transmission coordinator computing module 450 can identify one of the eMBB resource blocks 404 for interruption and "puncturing" by the first URLLC resource block 406a. The transmission coordinator computing module 450 can identify one of the eMBB resource blocks 404 based on a throughput of each of the eMBB resource blocks 404 to the respective UE 104. Specifically, the transmission coordinator computing module 450 can identify a third throughput of the first eMBB resource blocks 404a based on a maximal data size of the first URLLC resource blocks 406a and a maximal data size of the first eMBB resource blocks 404a. In some examples, the transmission coordinator computing module 450 can identify the third throughput of the first eMBB resource blocks 404a based on the difference between the maximal data size of the first URLLC resource blocks 406a and the maximal data size of the first eMBB resource blocks 404a. Similarly, the transmission coordinator computing module 450 can identify a fourth throughput of the second eMBB resource blocks 404b based on a maximal data size of the first URLLC resource blocks 406a and a maximal data size of the second eMBB resource blocks 404b. In some examples, the transmission coordinator computing module 450 can identify the fourth throughput of the second eMBB resource blocks 404b based on the difference between the maximal data size of the first URLLC resource blocks 406a and the maximal data size of the second eMBB resource blocks 404b.

The transmission coordinator computing module 450 can determine that the fourth throughput of the second eMBB resource blocks 404b is greater than the third throughput of the first eMBB resource blocks 404a. In response to determining that the fourth throughput of the second eMBB resource blocks 404b is greater than the first throughput of the second eMBB resource blocks 404a, the transmission coordinator computing module 450 can select the second eMBB resource blocks 404b for interrupting ("puncturing").

The base station 102, and in particular, the transmission coordinator computing module 450, transmits an interrupt transmission signal 478 to the UE 104b to indicate transmission of the second eMBB resource blocks 404b is interrupted, at step H. For example, the interrupt transmission signal 478 is carried by DCI scrambled with INT-RNTI on a PDCCH between the base station 102 and the UE 104b. The interrupt transmission signal 478 can indicate the resource (the second eMBB resource blocks 404b) in time and frequency domain. In some examples, the UE 104b, upon reception of the interrupt transmission signal 478, pauses transmission of the second eMBB resource blocks 404b to reduce power consumption at the UE 104b.

The base station 102, and in particular, the transmission coordinator computing module 450, transmits a scheduling grant signal 480 to the UE 104c for transmission of the first URLLC resource blocks 406a to the UE 104c, at step I. For example, the scheduling grant signal 480 is carried by DCI with CS-RNTI on PDCCH between the base station 102 and the UE 104c. The base station 102 begins transmitting the first URLLC resource blocks 406a to the UE 104c within the time window 512, at step J.

Figure 6:
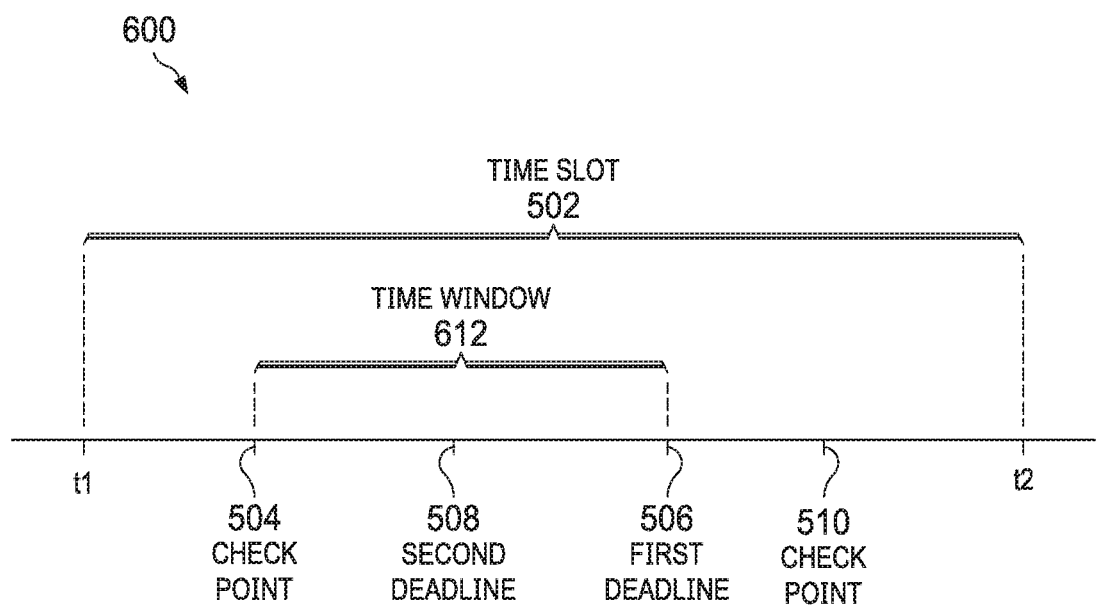

In some examples, when the transmission coordinator computing module 450 selects the first URLLC resource blocks 406a for transmission to the UE 104c, the transmission coordinator computing module 450 can determine that the time window 512 is insufficient for transmitting the first URLLC resource blocks 406a to the UE 140c. Specifically, the time afforded by the time window 512 can be insufficient for the time needed for transmitting the first URLLC resource blocks 406a to the UE 104c. The transmission coordinator computing module 450, in response to determining that the time window 512 is insufficient for transmitting the first URLLC resource blocks 406a to the UE 104c, can enlarge the time window 512. FIG. 6 illustrates a timing diagram 600 for the downlink transmission of FIG. 4 between the base station 102 and the UEs 104, with an enlarged time window. The transmission coordinator computing module 450 can enlarge the time window 512 within the time slot 502 for transmitting the first URLLC resource blocks 406a to the UE 104c. Specifically, the transmission coordinator computing module 450 can enlarge the time window 512 to an enlarged time window 612 defined between the first check point 504 and the first transmission deadline 506. In some examples, the first transmission deadline 506 is prior to the second check point 510. In some examples, the first transmission deadline 506 is after the second check point 510.

The base station 102 can transmit the first URLLC resource blocks 406a to the UE 104c within the enlarged time window 612 (e.g., at step J).

Figure 7:
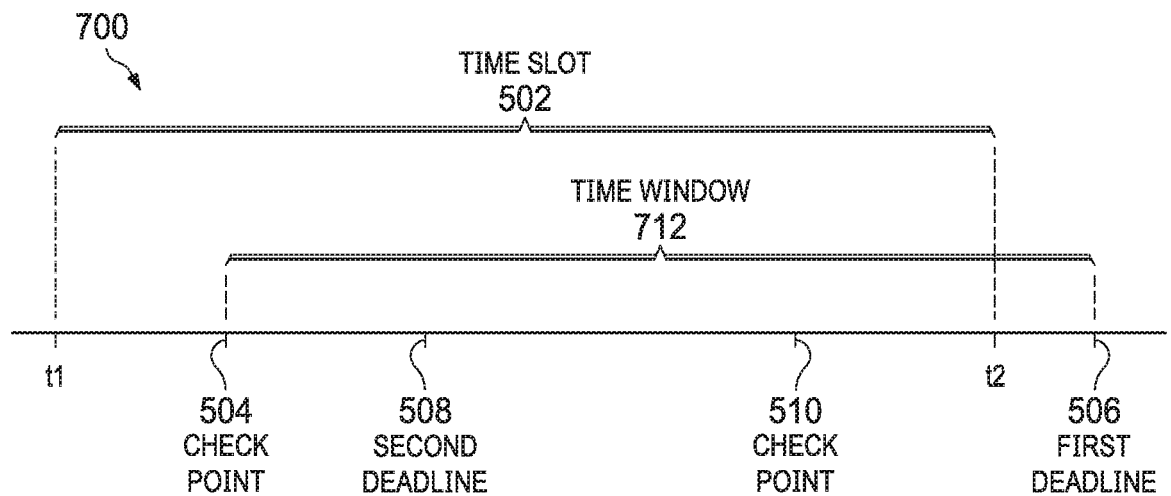

In some examples, the transmission coordinator computing module 450 generates the enlarged time window 612 beyond the time slot 502 when the first deadline 506 is after the time slot 502. FIG. 7 illustrates a timing diagram 700 for the downlink transmission of FIG. 4 between the base station 102 and the UEs 104, with an enlarged time window 712 that extends beyond the time slot 502. Specifically, when the transmission coordinator computing module 450 is extending the time window 512 when it is determined that the time window 512 is insufficient for transmitting the first URLLC resource blocks 406a to the UE 140c, the transmission coordinator computing module 450 extends the time window 512 to the enlarged time window 712 based on the size of the first URLLC resource blocks 406a and a time needed for the transmission of the first URLLC resource blocks 406a from the base stage 102 to the UE 104c. To that end, when extending the time window 512, the transmission coordinator computing module 450 can generate the enlarged time window 612 to have an end point that is after, or past, the time slot 502—up to the first transmission deadline 506 that can be after the time slot 502. The transmission coordinator computing module 450, when determining that the end point of the enlarged time window 702 is past the time slot 502, can block transmission of the first URLLC resource blocks 406a within the time slot 502. In some examples, the first URLLC resource blocks 406a are transmitted to the UE 104c in a subsequent time slot after the time slot 502.

Figure 8A:
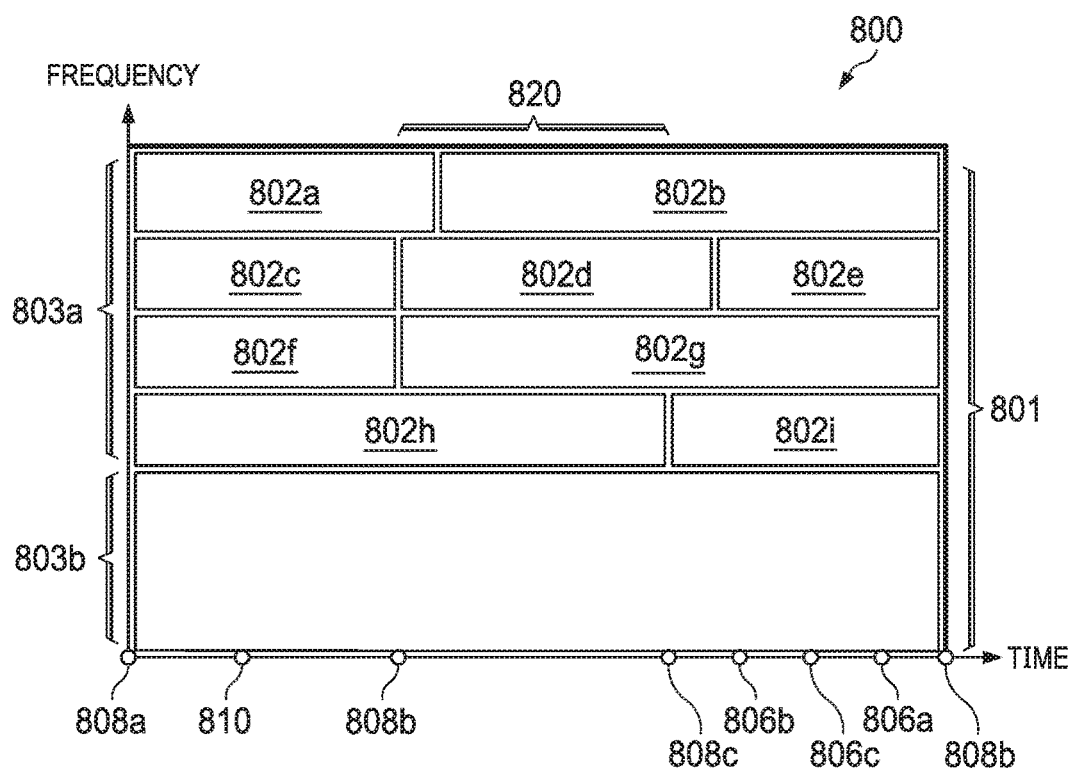
FIGS. 8A-8D illustrate an example of multiplexing within the network environment for dynamic service provisioning.

FIGS. 8A-8D illustrate an example of multiplexing of resource blocks within a communications network for dynamic service provisioning, e.g., by the network environment 400. FIG. 8A illustrates a timing diagram 800 illustrating transmission of eMBB resource blocks within a time period, and URLLC resource blocks to be inserted (or "punctured") within the time period. The timing diagram 800 can illustrate time along the y-axis and frequency along the x-axis, illustrating a channel bandwidth 801. A portion 803a of the bandwidth 801 may be available for transmission of the eMBB resource blocks, and a portion 803b be unavailable for transmission of the eMBB resource blocks.

In the illustrated example, eMBB resource blocks 802a, 802b, 802c, 802d, 802e, 802f, 802g, 802h, 802i (collectively referred to as eMBB resource blocks 802) are transmitted between a base station (e.g., base station 102) and one or more UEs (e.g., UEs 104). URLLC resource blocks 804a, 804b, 804c (shown in FIGS. 8B-8D; collectively referred to as URLLC resource blocks 804) are each associated with a respective transmission deadline 806a, 806b, 806c (collectively referred to as transmission deadlines 806). In the illustrated example, the transmission deadline 806c is after the transmission deadline 806b; and the transmission deadline 806a is after the transmission deadline 806c. Additionally, the timing diagram 800 can be associated with check points 808a, 808b, 808c, 808d (collectively referred to check points 808). Further, an arrival time 810 can refer to an arrival time of the URLLC resource blocks 804 (e.g., at the base station or the UEs). To that end, an initial time window 820 can be defined between check points 808b and 808c.

Figure 8B:
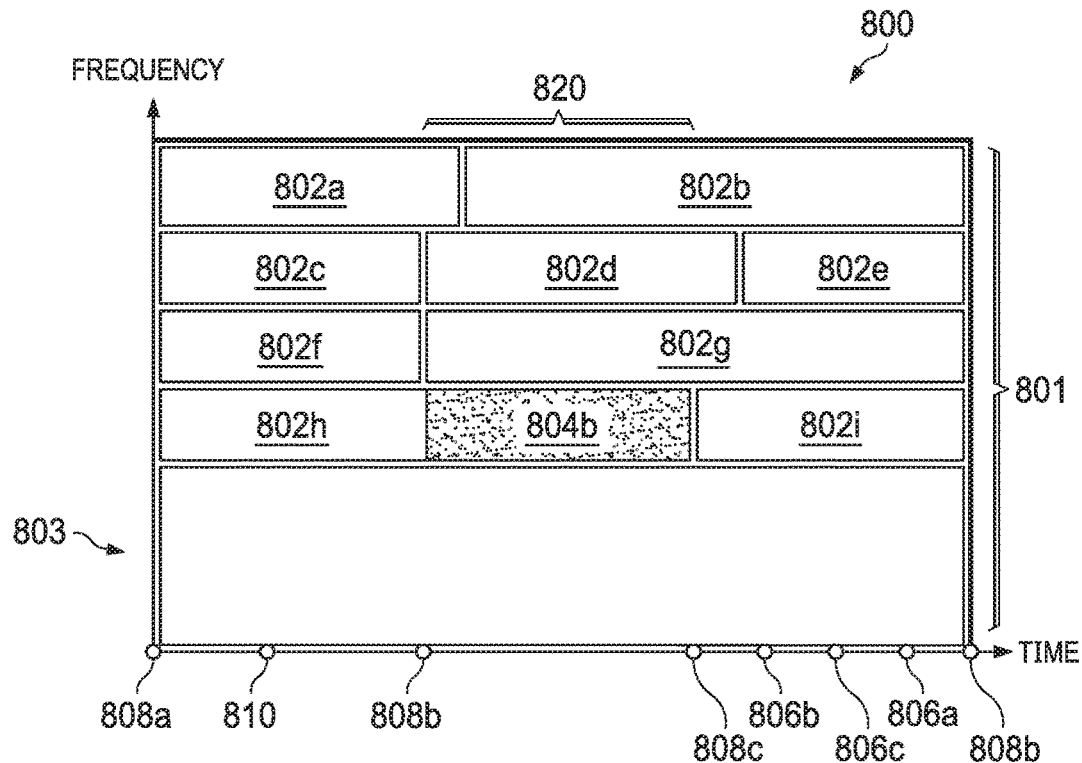

FIG. 8B illustrates the timing diagram 800 illustrating insertion (or "puncturing") of the URLLC resource blocks 804b within the eMBB resource blocks 802h. Specifically, as the transmission deadline 806b of the URLLC resource blocks 804b occurs prior to the transmission deadlines 806a, 806c of the URLLC resource blocks 804, 804c, the transmission coordinator computing module 450 can select the URLLC resource blocks 804b first for transmission to one of the UEs 104. Then, the transmission coordinator computing module 450 identifies the check point 808b as the first check point after the arrival time 810. The transmission coordinator computing module 450 can then identify the eMBB resource blocks 802d, 802g, and 802h as candidates for "puncturing" by the URLLC resource blocks 804b. The transmission coordinator computing module 450 selects the eMBB resource blocks 802d, 802g, 802h as these eMBB resource blocks are transmitted during the time window 820. The transmission coordinator computing module 450 identifies the throughput of each of the eMBB resource blocks 802d, 802g, 802h, and selects the eMBB resource blocks 802h for interruption based on a throughput of each of the eMBB resource blocks 802d, 802g, 802h. That is, the transmission coordinator computing module 450 can identify the throughput of each of the eMBB resource blocks 802d, 802g, 802h based on the difference between the maximal data size of the URLLC resource blocks 804b and the maximal data size of the respective eMBB resource blocks 802d, 802g, 802h. The transmission coordinator computing module 450 can identify the eMBB resource block 802h as having the highest throughput. The transmission coordinator computing module 450 can insert (or "puncture") the eMBB 802h with the URLLC resource blocks 804b.

Figure 8C:
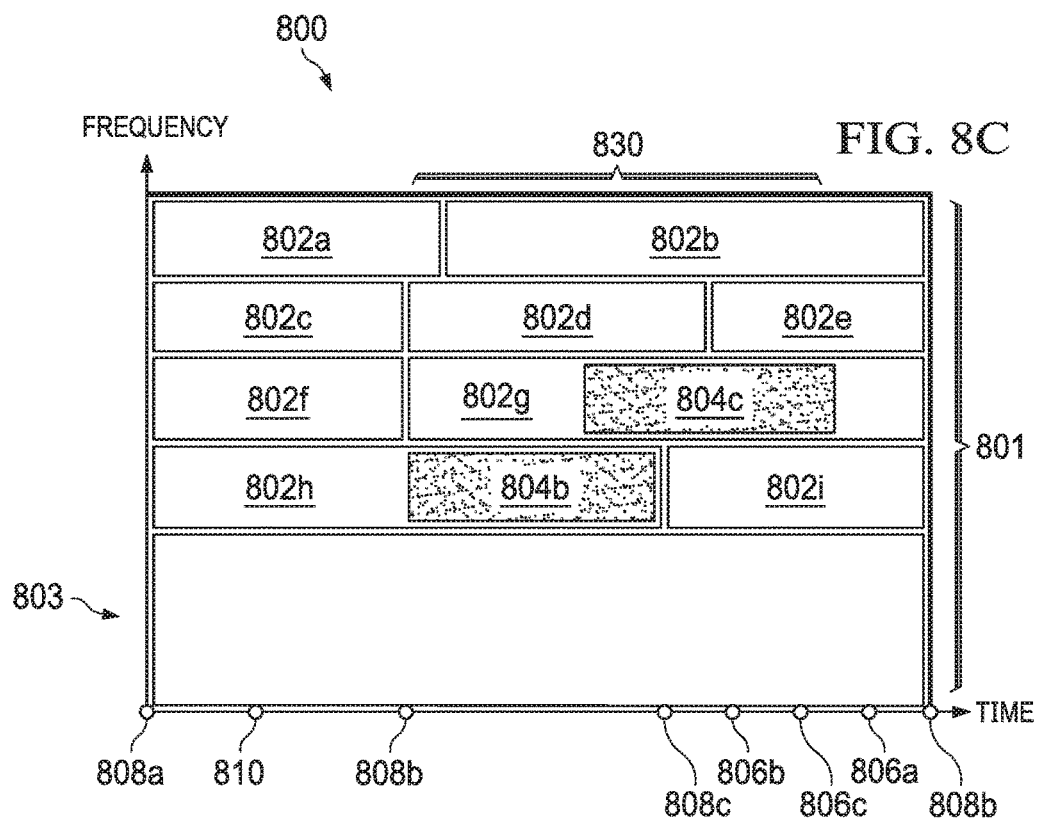

FIG. 8C illustrates the timing diagram 800 after insertion (or "puncturing") of the URLLC resource blocks 804c within the eMBB resource blocks 802g. The transmission coordinator computing module 450 can select the URLLC resource blocks 804c second for transmission to one of the UEs 104 (after transmission of the URLLC resource blocks 804b). The transmission coordinator computing module 450 can determine that the time window 820 is insufficient for transmission of the URLLC resource blocks 804c within one of the eMBB resource blocks 802. The transmission coordinator computing module 450 can enlarge the time window 820, and in particular, enlarge the time window from check point 808b to the transmission deadline 806c of the URLLC resource blocks 804c, generating enlarged time window 830. The transmission coordinator computing module 450 can select the eMBB resource blocks 802b and 802g as these eMBB resource blocks are transmitted during the time window 830. The transmission coordinator computing module 450 identifies the throughput of each of the eMBB resource blocks 802b, 802g and selects the eMBB 802g for interruption based on a throughput of each of the eMBB resource blocks 802b, 802g. That is, the transmission coordinator computing module 450 can identify the throughput of each of the eMBB resource blocks 802b, 802g based on the difference between the maximal data size of the URLLC resource blocks 804c and the maximal data size of the respective eMBB resource blocks 802b, 802g. The transmission coordinator computing module 450 can identify the eMBB resource block 802g as having the highest throughput. The transmission coordinator computing module 450 can insert (or "puncture") the eMBB 802g with the URLLC resource blocks 804b.

Figure 8D:
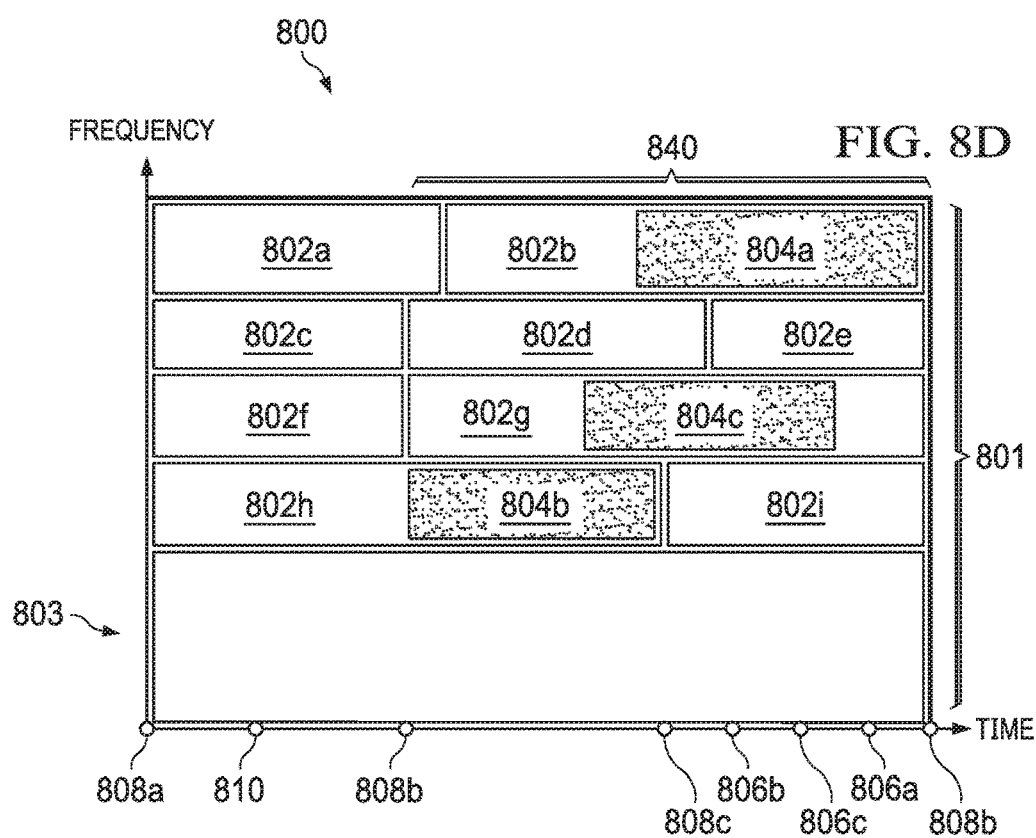

FIG. 8D illustrates the timing diagram 800 after insertion (or "puncturing") of the URLLC resource blocks 804a within the eMBB resource blocks 802b. The transmission coordinator computing module 450 can select the URLLC resource blocks 804a third (and last) for transmission to one of the UEs 104 (after transmission of the URLLC resource blocks 804c, 804b). The transmission coordinator computing module 450 can determine that the time window 830 is insufficient for transmission of the URLLC resource blocks 804a within one of the eMBB resource blocks 802. The transmission coordinator computing module 450 can enlarge the time window 830, and in particular, enlarge the time window from check point 808b to the transmission deadline 806a of the URLLC resource blocks 804a, generating enlarged time window 840. The transmission coordinator computing module 450 can select the eMBB resource blocks 802b as this eMBB is transmitted during the time window 840. The transmission coordinator computing module 450 can insert (or "puncture") the eMBB resource blocks 802b with the URLLC resource blocks 804a.

Figure 10:
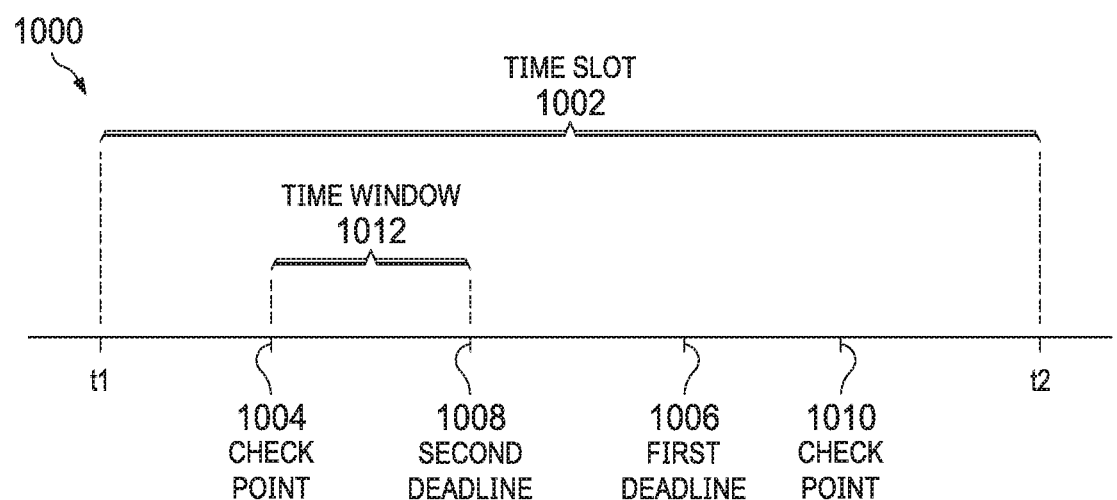
FIG. 10 illustrates a timing diagram for the uplink transmission of resource blocks between the base station and the user equipment.
Figure 9:
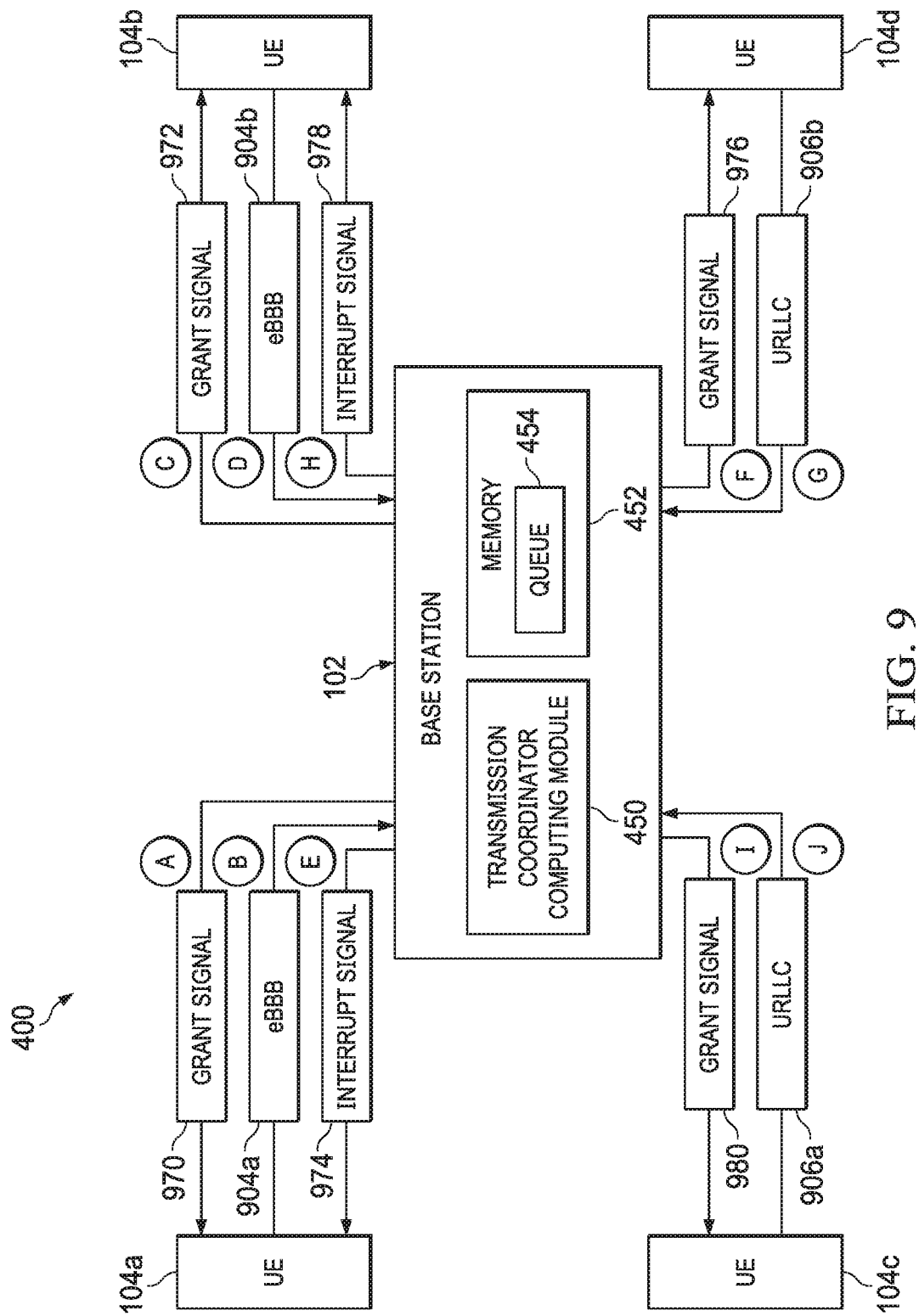
FIG. 9 is a block diagram of the network environment illustrating an uplink transmission between the base station and the user equipment.

FIG. 9 illustrates a network environment 900 illustrating an uplink transmission between the base station 102 and the UEs 104. The network environment 900 can be similar to the network environment 100 of FIG. 1. FIG. 10 illustrates a timing diagram 1000 for the downlink transmission illustrated in FIG. 9 between the base station 102 and the UEs 104.

The base station 102, and in particular, the transmission coordinator computing module 450, transmits a scheduling grant signal 970 to the UE 104a for transmission of first eMBB resource blocks 904a from the UE 104a, at step A. For example, the scheduling grant signal 970 is carried by downlink control information (DCI) scrambled with a configured scheduled-radio network temporary identifier (CS-RNTI) on a physical download control channel (PDCCH) between the base station 102 and the UE 104a. The UE 104a begins transmitting the first eMBB resource blocks 904a to the base station 102, at step B.

The base station 102, and in particular, the transmission coordinator computing module 450, transmits a scheduling grant signal 972 to the UE 104b for transmission of second eMBB resource blocks 904b from the UE 104b, at step C. For example, the scheduling grant signal 972 is carried by DCI scrambled with CS-RNTI on PDCCH between the base station 102 and the UE 104b. The second UE 104b begins transmitting the second eMBB resource blocks 904b to the base station 102, at step D.

Referring to FIG. 10, the UEs 104a, 104b can transmit the eMBB resource blocks 904a, 904b (collectively referred to as eMBB resource blocks 904), respectively, within a time slot 1002. The time slot 1002 can be defined between a first time t1 and a second time t2.

Referring to both FIGS. 9 and 10, during transmission of the eMBB resource blocks 904a, 904b to the base station 102, respectively, URLLC resource blocks can be inserted into the eMBB resource blocks 904 ("punctured"). Specifically, at a first scheduled check point 1004 of the time slot 1002, URLLC resource blocks can be inserted into the eMBB resource blocks 904. The base station 102, and in particular, the transmission coordinator computing module 450, can identify first URLLC resource blocks 906a to be transmitted from the UE 104c to the base station 102, and second URLLC resource blocks 906b to be transmitted by the UE 104d and received by the base station 102. The URLLC resource blocks 906a, 906b (collectively referred to as URLLC resource blocks 906) can be inserted into the eMBB resource blocks 904, described further herein.

The base station 102, and in particular, the transmission coordinator computing module 450, identifies a first transmission deadline 1006 for transmitting the first URLLC resource blocks 906a to the base station 102; and identifies a second transmission deadline 1008 for transmitting the second URLLC resource blocks 906b to the base station 102. As illustrated, the second transmission deadline 1008 is prior to the first transmission deadline 1006.

The base station 102, and in particular, the transmission coordinator computing module 450, generates a transmission queue 954 that is stored by the memory 452. The transmission queue 954 includes a listing of the first URLLC resource block 906a and the second URLLC resource block 906b. The order of the listing of the URLLC resource blocks 906 within the transmission queue 954 is based on the first transmission deadline 1006 and the second transmission deadline 1008. Specifically, the order of the listing of the URLLC resource blocks 906 is based on an ascending order of the deadlines 1006, 1008. In other words, the order of the listing of the URLLC resource blocks 906 indicates a transmission sequence for the URLLC resource blocks 906. To that end, as the second transmission deadline 1008 is prior to the first transmission deadline 1006, the second URLLC resource blocks 906b are slotted first for transmission at the transmission queue 954, and the first resource blocks 906a are slotted second for transmission at the transmission queue 954.

The transmission coordinator computing module 450 can select, based on the transmission queue 954, the second URLLC resource blocks 906b for reception by the base station 102. That is, as the transmission queue 954 indicates the second URLLC resource block 906b slotted first, the transmission coordinator computing module 450 can select the second URLLC resource blocks 906b for reception by the base station 102 (e.g., prior to selecting the first URLLC resource blocks 906a for reception by the base station 102).

Specifically, the transmission coordinator computing module 450 can identify a time window within the time slot 1002 for receiving the second URLLC resource blocks 906b from the UE 104d. The second URLLC resource blocks 906b are permitted to be scheduled for "puncturing" of an eMBB resource block 904 within the time window. The transmission coordinator computing module 450 can identify the beginning of the time window at the nearest check point and the end of the time window as the minimum of the next check point and the second transmission deadline 908 for the second URLLC resource block 906b. In other words, the time window is defined between [Tc, Min(Tn, d)], where Tc is the first check point 1004, Tn is a second check point 1010, and d is the second transmission deadline 1008. In the current example, the transmission coordinator computing module 450 identifies a time window 1012 between the first check point 1004 and the second check point 1010. The second transmission deadline 1008 is prior to the second check point 1010.

Additionally, the transmission coordinator computing module 450 can identify one of the eMBB resource blocks 904 for interruption and "puncturing" by the second URLLC resource block 906b. The transmission coordinator computing module 450 can identify one of the eMBB resource blocks 904 based on a throughput of each of the eMBB resource blocks 904 to the base station 102. Specifically, the transmission coordinator computing module 450 can identify a first throughput of the first eMBB resource blocks 904a based on a maximal data size of the second URLLC resource blocks 906b and a maximal data size of the first eMBB resource blocks 904a. In some examples, the transmission coordinator computing module 450 can identify the first throughput of the first eMBB resource blocks 904a based on the difference between the maximal data size of the second URLLC resource blocks 906b and the maximal data size of the first eMBB resource blocks 904a. For example, the base station 102 can transmit the first eMBB resource blocks 904a to the UE 104a utilizing 16 QAM modulation format with a coding rate of 30 Mb (maximal data size of the first eMBB resource blocks 904a). Additionally, the maximal data size of the second URLLC resource blocks 906b can be 100 Mb. Thus, the first throughput of the first eMBB resource blocks 904a can be 70 Mb Similarly, the transmission coordinator computing module 450 can identify a second throughput of the second eMBB resource blocks 904b based on a maximal data size of the second URLLC resource blocks 906b and a maximal data size of the second eMBB resource blocks 904b. In some examples, the transmission coordinator computing module 450 can identify the second throughput of the second eMBB resource blocks 904b based on the difference between the maximal data size of the second URLLC resource blocks 906b and the maximal data size of the second eMBB resource blocks 904b. For example, the base station 102 can transmit the second eMBB resource blocks 904a to the UE 104b utilizing QPSK modulation format with a coding rate of 80 Mb (maximal data size of the second eMBB resource blocks 404b). Additionally, the maximal data size of the second URLLC resource blocks 906b can be 100 Mb. Thus, the second throughput of the second eMBB resource blocks 904b can be 20 Mb The transmission coordinator computing module 450 can determine that the first throughput of the first eMBB resource blocks 904a is greater than the second throughput of the second eMBB resource blocks 904b. In response to determining that the first throughput of the first eMBB resource blocks 904a is greater than the second throughput of the second eMBB resource blocks 904b, the transmission coordinator computing module 450 can select the first eMBB resource blocks 904a for interrupting ("puncturing"). For example, as the second throughput of the second eMBB resource blocks 904b (70 Mb) is greater than the first throughput of the first eMBB resource blocks 904a (20 Mb), the transmission coordinator computing module 450 can select the first eMBB resource blocks 404a for interrupting ("puncturing").

The base station 102, and in particular, the transmission coordinator computing module 450, transmits an interrupt transmission signal 974 to the UE 104a to indicate transmission of the first eMBB resource blocks 904a is interrupted, at step E. For example, the interrupt transmission signal 974 is carried by DCI scrambled with an interruption-radio network temporary identifier (INT-RNTI) on a PDCCH between the base station 102 and the UE 104a. The interrupt transmission signal can indicate the resource (first eMBB resource blocks 904a) in time and frequency domain. In some examples, the UE 104a, upon reception of the interrupt transmission signal 974, pauses transmission of the first eMBB resource blocks 904a to reduce power consumption at the UE 104a.

The base station 102, and in particular, the transmission coordinator computing module 450, transmits a scheduling grant signal 976 to the UE 104d for transmission of the second URLLC resource blocks 906b from the UE 104d to the base station 102, at step F. For example, the scheduling grant signal 976 is carried by DCI with CS-RNTI on PDCCH between the base station 102 and the UE 104e. The base station 102 begins receiving the second URLLC resource blocks 906b from the UE 104d within the time window 1012, at step G.

The base station 102 can complete reception of the second URLLC resource blocks 906b from the UE 104d within the time window 1012. In some examples, after completion of the reception of the second URLLC resource blocks 906b from the UE 104d, the base station 102 resumes reception of the first eMBB resource blocks 904a from the UE 104a.

In some examples, after completion of the reception of the second URLLC resource blocks 906b from the UE 104d, the transmission coordinator computing module 450 can select, based on the transmission queue 954, the first URLLC resource blocks 906a for reception at the base station 102 from the UE 104c. That is, as the transmission queue 954 indicates the first URLLC resource block 906a slotted second, the transmission coordinator computing module 450 can select the first URLLC resource blocks 906a for reception from the UE 104c second (e.g., after selecting the second URLLC resource blocks 906b for reception from the UE 104d).

The transmission coordinator computing module 450 can identify one of the eMBB resource blocks 904 for interruption and "puncturing" by the first URLLC resource block 906a. The transmission coordinator computing module 450 can identify one of the eMBB resource blocks 904 based on a throughput of each of the eMBB resource blocks 904 from the respective UE 104. Specifically, the transmission coordinator computing module 450 can identify a third throughput of the first eMBB resource blocks 904a based on a maximal data size of the first URLLC resource blocks 906a and a maximal data size of the first eMBB resource blocks 904a. In some examples, the transmission coordinator computing module 450 can identify the third throughput of the first eMBB resource blocks 904a based on the difference between the maximal data size of the first URLLC resource blocks 906a and the maximal data size of the first eMBB resource blocks 904a. Similarly, the transmission coordinator computing module 450 can identify a fourth throughput of the second eMBB resource blocks 904b based on a maximal data size of the first URLLC resource blocks 906a and a maximal data size of the second eMBB resource blocks 904b. In some examples, the transmission coordinator computing module 450 can identify the fourth throughput of the second eMBB resource blocks 904b based on the difference between the maximal data size of the first URLLC resource blocks 906a and the maximal data size of the second eMBB resource blocks 904b.

The transmission coordinator computing module 450 can determine that the fourth throughput of the second eMBB resource blocks 904b is greater than the third throughput of the first eMBB resource blocks 904a. In response to determining that the fourth throughput of the second eMBB resource blocks 904b is greater than the first throughput of the second eMBB resource blocks 904a, the transmission coordinator computing module 450 can select the second eMBB resource blocks 904b for interrupting ("puncturing").

The base station 102, and in particular, the transmission coordinator computing module 450, transmits an interrupt transmission signal 978 to the UE 104b to indicate transmission of the second eMBB resource blocks 904b from the UE 104b to the base station 102 is interrupted, at step H. For example, the interrupt transmission signal 978 is carried by DCI scrambled with INT-RNTI on a PDCCH between the base station 102 and the UE 104b. The interrupt transmission signal 978 can indicate the resource (the second eMBB resource blocks 904b) in time and frequency domain. In some examples, the UE 104b, upon reception of the interrupt transmission signal 978, pauses transmission of the second eMBB resource blocks 904b to reduce power consumption at the UE 104b.

The base station 102, and in particular, the transmission coordinator computing module 450, transmits a scheduling grant signal 980 to the UE 104c for transmission of the first URLLC resource blocks 906a from the UE 104c to the base station 102, at step I. For example, the scheduling grant signal 980 is carried by DCI with CS-RNTI on PDCCH between the base station 102 and the UE 104c. The base station 102 begins reception of the first URLLC resource blocks 906a from the UE 104c within the time window 512, at step J.

Figure 11:
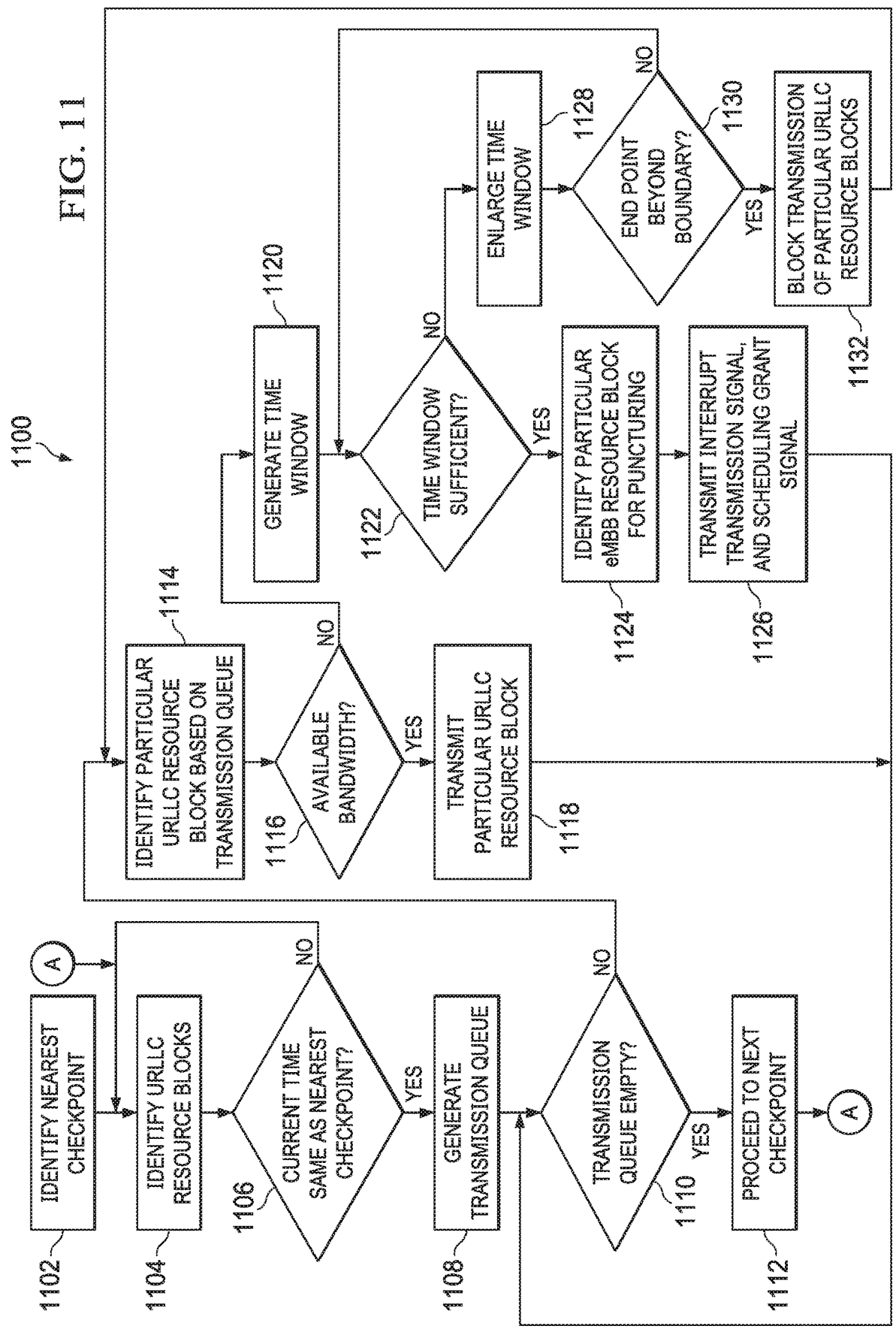
FIGS. 11, 12 illustrate respective flowcharts for multiplexing within the communications network for dynamic service provisioning.

FIG. 11 illustrates a flowchart depicting selected elements of an embodiment of a method 1100 for multiplexing within a communications network for dynamic service provisioning. The method 1100 may be performed by the base station 102, the UEs 104, and/or the transmission coordinator computing module 450 described herein with reference to FIGS. 1-10. It is noted that certain operations described in method 1100 may be optional or may be rearranged in different embodiments.

The transmission coordinator computing module 450 identifies a nearest checkpoint to a current time (e.g., checkpoint 504), at 1102. The transmission coordinator computing module 450 identifies the URLLC resource blocks (e.g., URLLC resource blocks 406, 906) to be transmitted between the base station 102 and the UE 104, at 1104. The transmission coordinator computing module 450 determines if the current time is the same as the nearest checkpoint, at 1106. If the current time is not the same as the nearest checkpoint, the method returns to step 1104. If the current time is the same as the nearest checkpoint, the transmission coordinator computing module 450 generates a transmission queue (e.g., the transmission queue 454, 954) for the URLLC resource blocks, at 1108. The transmission coordinator computing module 450 determines if the transmission queue is empty, at 1110. If the transmission coordinator computing module 450 determines that the transmission queue is empty, the transmission coordinator computing module 450 proceeds to the next checking point, at 1112; and returns to step 1104. If the transmission coordinator computing module 450 determines that the transmission queue is not empty, the transmission coordinator computing module 450 identifies a particular URLLC resource block at the top of the transmission queue for transmission, at 1114.

The transmission coordinator computing module 450 determines if there is available bandwidth at the base station 102 for transmission of the particular URLLC resource block, at 1116. If there is available bandwidth for transmission at the base station 102 for transmission of the particular URLLC resource block, the particular URLLC resource block is transmitted between the base station 102 and a particular UE 104, at 1118. If there is not available bandwidth for transmission at the base station 102 for transmission of the particular URLLC resource block, the transmission coordinator computing module 450 generates a time window (e.g., the time window 512, 1012) for transmission of the particular URLLC resource block, at 1120. The transmission coordinator computing module 450 determines if the time window is sufficient for transmission of the particular URLLC resource block, at 1122. If the transmission coordinator computing module 450 determines that the time window is sufficient for transmission of the particular URLLC resource blocks, the transmission coordinator computing module 450 identifies particular eMBB resource blocks (e.g., the eMBB resource blocks 404, 904) for inserting ("puncturing") of the particular URLLC resource blocks that maximizes throughput of the network, at 1124. The transmission coordinator computing module 450 transmits an interrupt transmission signal to the UE associated with the particular eMBB resource blocks that is being transmitted between the base station and the UE, and a transmits a scheduling grant signal to the UE associated with the particular URLLC resource blocks, at 1126. The method then returns to step 1110.

If the transmission coordinator computing module 450 determines that the time window is insufficient for transmission of the particular URLLC resource blocks, the transmission coordinator computing module 450 can enlarge the time window (e.g., the enlarged time window 612), at 1128. The transmission coordinator computing module 450 determines if an end point of the enlarged time window is beyond a boundary (e.g., a second check point), at 1130. If the transmission coordinator computing module 450 determines that the end point of the enlarged time window is not beyond the boundary, the method proceed to step 1122. If the transmission coordinator computing module 450 determines that the end point of the enlarged time window is beyond the boundary (e.g., the enlarged time window 712), the transmission coordinator computing module 450 blocks transmission of the particular URLLC resource blocks, at 1132. The method then returns to step 1114.

Figure 12:
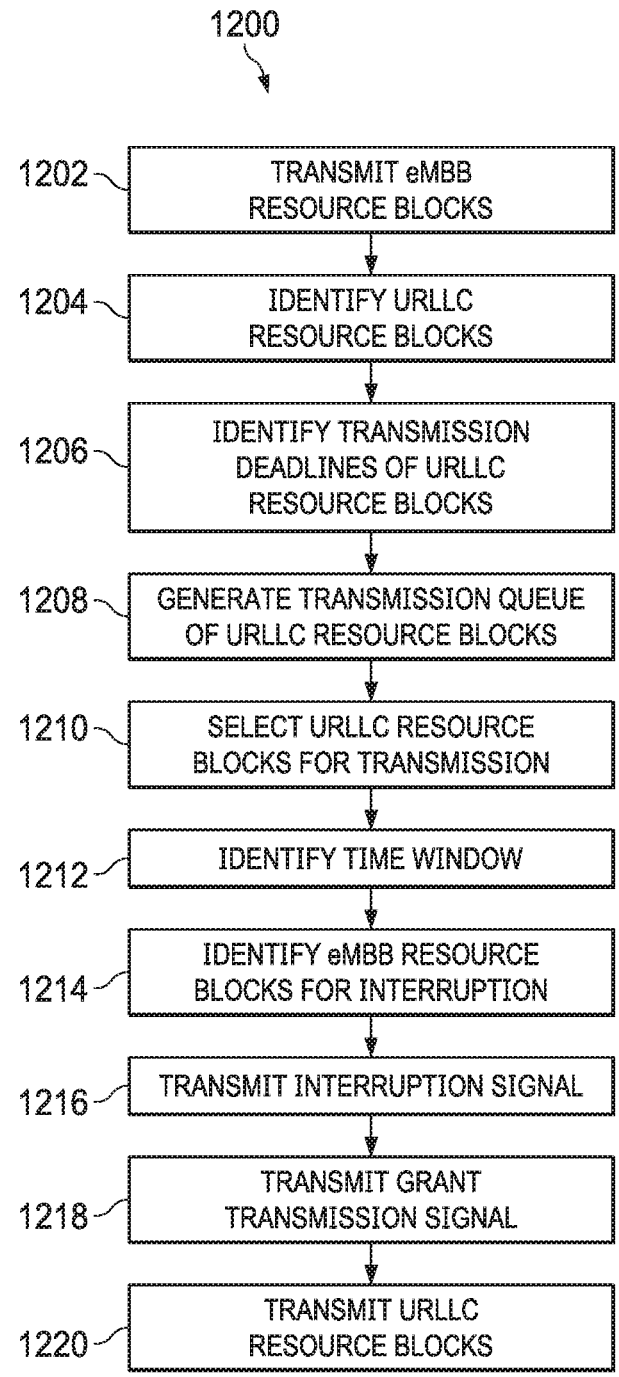

FIG. 12 illustrates a flowchart depicting selected elements of an embodiment of a method 1200 for multiplexing within a communications network for dynamic service provisioning. The method 1200 may be performed by the base station 102, the UEs 104, and/or the transmission coordinator computing module 450 described herein with reference to FIGS. 1-10. It is noted that certain operations described in method 1200 may be optional or may be rearranged in different embodiments.

The base station 102, and in particular, the transmission coordinator computing module 450 transmits, within the time slot 502, eMBB resource blocks 404a to UE 104a; and eMBB resource blocks 404b to UE 104b, at 1202. The transmission coordinator computing module 450 can identify URLLC resource blocks 406a to be transmitted to the UE 104c; and URLLC resource blocks 406b to UE 104d, at 1204. The transmission coordinator computing module 450 can identify the first transmission deadline 506 for the URLLC resource blocks 406a; and the second transmission deadline 508 for the URLLC resource blocks 406b, at 1206. In some examples, the second transmission deadline 508 is after the first transmission deadline 506. The transmission coordinator computing module 450 generates the transmission queue 454 for the URLLC resource blocks 406a, 406b, at 1208. The order of the transmission queue 454 is based on the first transmission deadline 506 and the second transmission deadline 508. The transmission coordinator computing module 450 can select, based on the transmission queue 454, the URLLC resource blocks 406b for transmission to the UE 104d, at 1210. The transmission coordinator computing module 450 identifies the time window 512 within the time slot 502 for transmitting the URLLC resource blocks 406b to the UE 104d, at 1212. The transmission coordinator computing module 450 identifies the eMBB resource blocks 404a for interruption based on a throughput of each of the eMBB resource blocks 404a, 404b, at 1214. The transmission coordinator computing module 450 transmits an interrupt transmission signal to the UE 104a indicating the transmission of the eMBB resource block 404a is interrupted, at 1216. The transmission coordinator computing module 450 transmits a grant transmission signal to the UE 104d indicating transmission of the URLLC resource blocks 406b, at 1218. The transmission coordinator computing module 450 transmits the URLLC resource blocks 406b to the UE 104d within the time window 512, at 1220.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for multiplexing within a communications network, the method comprising:
    transmitting, within a time slot, i) first enhanced mobile broadband (eMBB) resource blocks to a first user equipment (UE) and ii) second eMBB resource blocks to a second UE, the time slot including scheduled checkpoints;

during transmission of the first and the second eMBB resource blocks to the first and the second UE, respectively, at a first scheduled check point of the schedule checkpoints of the time slot:
  identifying i) first ultra reliable low latency communication (URLLC) resource blocks to be transmitted to a third UE and ii) second URLLC resource blocks to be transmitted to a fourth UE;
  identifying i) a first transmission deadline for transmitting the first URLLC resource blocks to the third UE and ii) a second transmission deadline for transmitting the second URLLC resource blocks to the fourth UE, wherein the second transmission deadline is prior to the first transmission deadline;
  generating a transmission queue for the first URLLC resource blocks and the second URLLC resource blocks, wherein an order of the transmission queue is based on the first transmission deadline of the first URLLC resource blocks and the second transmission deadline of the second URLLC resource blocks;
  selecting, based on the transmission queue, the second URLLC resource blocks for transmission to the fourth UE, including:
    identifying a time window within the time slot for transmitting the second URLLC resource blocks to the fourth UE, the time window defined between the first scheduled check point and a second scheduled check point after the first scheduled check point;
    identifying the first eMBB resource blocks for interruption based on a throughput of each the first eMBB resource blocks and the second eMBB resource blocks to the first UE and the second UE, respectively;
    transmitting an interrupt transmission signal to the first UE indicating the transmission of the first eMBB resource blocks is interrupted;
    transmitting a grant transmission signal to the fourth UE indicating transmission of the second URLLC resource blocks; and
    transmitting the second URLLC resource blocks to the fourth UE within the time window.

2. The computer-implemented method of claim 1, further comprising:
  after transmitting the second URLLC resource blocks to the fourth UE within the time window, resuming transmission of the first eMBB resource blocks to the first UE.

3. The computer-implemented method of claim 1, wherein the second transmission deadline is before the second scheduled check point.

4. The computer-implemented method of claim 1, further comprising:
  after transmitting the second URLLC resource blocks to the fourth UE, selecting the first URLLC resource blocks for transmission to the third UE, including:
    identifying the second eMBB resource blocks for interruption based on the throughput of each the first eMBB resource blocks and the second eMBB resource blocks to the first UE and the second UE, respectively;
    transmitting an additional interrupt transmission signal to the second UE indicating the transmission of the second eMBB resource blocks is interrupted;
    transmitting an additional grant transmission signal to the third UE indicating transmission of the first URLLC resource blocks; and
    transmitting the first URLLC resource blocks to the third UE within the time window.

5. The computer-implemented method of claim 1, further comprising:
  after transmitting the second URLLC resource blocks to the fourth UE, selecting the first URLLC resource blocks for transmission to the third UE, including:
    determining that the time window is insufficient for transmitting the first URLLC resource blocks to the third UE;
    in response to determining that the time window is insufficient for transmitting the first URLLC resource blocks to the third UE, enlarging the time window, the enlarged time window defined between the first scheduled check point and the first transmission deadline;
    identifying the second eMBB resource blocks for interruption based on the throughput of each the first eMBB resource blocks and the second eMBB resource blocks to the first UE and the second UE, respectively;
    transmitting an additional interrupt transmission signal to the second UE indicating the transmission of the second eMBB resource blocks is interrupted;
    transmitting an additional grant transmission signal to the third UE indicating transmission of the first URLLC resource blocks; and
    transmitting the first URLLC resource blocks to the third UE within the enlarged time window.

6. The computer-implemented method of claim 5, wherein the first transmission deadline is after the second scheduled check point.

7. The computer-implemented method of claim 1, further comprising:
  after transmitting the second URLLC resource blocks to the fourth UE, selecting the first URLLC resource blocks for transmission to the third UE, including:
    determining that the time window is insufficient for transmitting the first URLLC resource blocks to the third UE;
    in response to determining that the time window is insufficient for transmitting the first URLLC resource blocks to the third UE, enlarging the time window;
    determining that an end point of the enlarged time window is past the time slot; and
    in response to determining that the end point of the enlarged time window is past the time slot, blocking transmission of the first URLLC resource blocks within the time slot.

8. The computer-implemented method of claim 1, wherein identifying the first eMBB resource blocks for interruption based on the throughput of each the first eMBB resource blocks and the second eMBB resource blocks to the first UE and the second UE, respectively, comprises:
  identifying a first throughput of the first eMBB resource blocks based on a difference of a maximal data size of the second URLLC resource blocks and a maximal data size of the first eMBB resource blocks;
  identifying a second throughput of the second eMBB resource blocks based on a difference of a maximal data size of the second URLLC resource blocks and a maximal data size of the second eMBB resource blocks; and
  determining that the first throughput is greater than the second throughput, and in response, selecting the first eMBB resource blocks for interruption.

9. A system comprising a processor having access to memory media storing instructions executable by the processor to perform operations comprising:

transmitting, within a time slot, i) first enhanced mobile broadband (eMBB) resource blocks to a first user equipment (UE) and ii) second eMBB resource blocks to a second UE, the time slot including scheduled checkpoints;

during transmission of the first and the second eMBB resource blocks to the first and the second UE, respectively, at a first scheduled check point of the schedule checkpoints of the time slot:

identifying i) first ultra reliable low latency communication (URLLC) resource blocks to be transmitted to a third UE and ii) second URLLC resource blocks to be transmitted to a fourth UE;

identifying i) a first transmission deadline for transmitting the first URLLC resource blocks to the third UE and ii) a second transmission deadline for transmitting the second URLLC resource blocks to the fourth UE, wherein the second transmission deadline is prior to the first transmission deadline;

generating a transmission queue for the first URLLC resource blocks and the second URLLC resource blocks, wherein an order of the transmission queue is based on the first transmission deadline of the first URLLC resource blocks and the second transmission deadline of the second URLLC resource blocks;

selecting, based on the transmission queue, the second URLLC resource blocks for transmission to the fourth UE, including:

identifying a time window within the time slot for transmitting the second URLLC resource blocks to the fourth UE, the time window defined between the first scheduled check point and a second scheduled check point after the first scheduled check point;

identifying the first eMBB resource blocks for interruption based on a throughput of each the first eMBB resource blocks and the second eMBB resource blocks to the first UE and the second UE, respectively;

transmitting an interrupt transmission signal to the first UE indicating the transmission of the first eMBB resource blocks is interrupted;

transmitting a grant transmission signal to the fourth UE indicating transmission of the second URLLC resource blocks; and transmitting the second URLLC resource blocks to the fourth UE within the time window.

10. The system of claim 9, the operations further comprising:

after transmitting the second URLLC resource blocks to the fourth UE within the time window, resuming transmission of the first eMBB resource blocks to the first UE.

11. The system of claim 9, wherein the second transmission deadline is before the second scheduled check point.

12. The system of claim 9, the operations further comprising:

after transmitting the second URLLC resource blocks to the fourth UE, selecting the first URLLC resource blocks for transmission to the third UE, including:

identifying the second eMBB resource blocks for interruption based on the throughput of each the first eMBB resource blocks and the second eMBB resource blocks to the first UE and the second UE, respectively;

transmitting an additional interrupt transmission signal to the second UE indicating the transmission of the second eMBB resource blocks is interrupted;

transmitting an additional grant transmission signal to the third UE indicating transmission of the first URLLC resource blocks; and transmitting the first URLLC resource blocks to the third UE within the time window.

13. The system of claim 9, the operations further comprising:

after transmitting the second URLLC resource blocks to the fourth UE, selecting the first URLLC resource blocks for transmission to the third UE, including:

determining that the time window is insufficient for transmitting the first URLLC resource blocks to the third UE;

in response to determining that the time window is insufficient for transmitting the first URLLC resource blocks to the third UE, enlarging the time window, the enlarged time window defined between the first scheduled check point and the first transmission deadline;

identifying the second eMBB resource blocks for interruption based on the throughput of each the first eMBB resource blocks and the second eMBB resource blocks to the first UE and the second UE, respectively;

transmitting an additional interrupt transmission signal to the second UE indicating the transmission of the second eMBB resource blocks is interrupted;

transmitting an additional grant transmission signal to the third UE indicating transmission of the first URLLC resource blocks; and transmitting the first URLLC resource blocks to the third UE within the additional time window.

14. The system of claim 13, wherein the first transmission deadline is after the second scheduled check point.

15. The system of claim 9, the operations further comprising:

after transmitting the second URLLC resource blocks to the fourth UE, selecting the first URLLC resource blocks for transmission to the third UE, including:

determining that the time window is insufficient for transmitting the first URLLC resource blocks to the third UE;

in response to determining that the time window is insufficient for transmitting the first URLLC resource blocks to the third UE, enlarging the time window;

determining that an end point of the enlarged time window is past the time slot; and in response to determining that the end point of the enlarged time window is past the time slot, blocking transmission of the first URLLC resource blocks within the time slot.

16. The system of claim 9, wherein identifying the first eMBB resource blocks for interruption based on the throughput of each the first eMBB resource blocks and the second eMBB resource blocks to the first UE and the second UE, respectively, comprises:

identifying a first throughput of the first eMBB resource blocks based on a difference of a maximal data size of the second URLLC resource blocks and a maximal data size of the first eMBB resource blocks;

identifying a second throughput of the second eMBB resource blocks based on a difference of a maximal data size of the second URLLC resource blocks and a maximal data size of the second eMBB resource blocks; and determining that the first throughput is greater than the second throughput, and in response, selecting the first eMBB resource blocks for interruption.

\* \* \* \* \*